United States Patent
Kao

[11] 4,057,322
[45] Nov. 8, 1977

[54] PRECISION SURFACE OPTICAL FIBERS

[75] Inventor: Charles K. Kao, Roanoke, Va.

[73] Assignee: International Telephone and Telegraph Corporation, Nutley, N.J.

[21] Appl. No.: 629,210

[22] Filed: Nov. 5, 1975

[51] Int. Cl.² ............................................. G02B 5/16
[52] U.S. Cl. ............................... 350/96 R; 350/96 C
[58] Field of Search ............. 350/96 WG, 96 B, 96 C, 350/96 R; 65/4 R, 4 B, DIG. 7

[56] References Cited

U.S. PATENT DOCUMENTS

| | | | |
|---|---|---|---|
| 2,825,260 | 3/1958 | O'Brien | 65/4 B X |
| 3,505,046 | 4/1970 | Phaneuf | 65/4 B X |
| 3,535,017 | 10/1970 | Miller | 350/96 B |
| 3,615,313 | 10/1971 | Phaneuf | 65/4 B X |
| 3,789,485 | 2/1974 | Gudmestad | 350/96 C X |
| 3,846,010 | 11/1974 | Love et al. | 350/96 WG |
| 3,847,696 | 11/1974 | Ortner | 65/DIG. 7 X |

FOREIGN PATENT DOCUMENTS

| | | | |
|---|---|---|---|
| 1,267,788 | 3/1972 | United Kingdom | 65/4 B |

*Primary Examiner*—John K. Corbin
*Assistant Examiner*—Rolf Hille
*Attorney, Agent, or Firm*—John T. O'Halloran; Peter C. Van Der Sluys

[57] ABSTRACT

Methods and apparatus are disclosed for forming a precision three-dimensional surface to clad optical fibers. One embodiment provides means for deforming the fiber end to conform to the geometry of the interstice formed between three tangential and parallel cylinders. The precision three-dimensional fiber end enables accurate low loss coupling between the fibers to be achieved through the accurate reference planes presented.

12 Claims, 20 Drawing Figures

PRECISION SURFACE OPTICAL FIBERS

BACKGROUND OF THE INVENTION

The small diameters of glass optical fibers make it very difficult for making connections between two fibers. Since most of the light travels through the small central core region of the fibers it is important that the cores of the fibers line up accurately in order to prevent the loss of light in transfer between cores of the two fibers to be connected. Another problem involved in coupling between optical fibers is the difference in diameter and the uncertainty as to the effective location of the core center relative to the outer perimeter of the fiber.

One effective method for overcoming the problems involved in coupling between adjoining optical fiber ends is that provided in U.S. patent application Ser. No. 613,390, filed Sept. 15, 1975 and assigned to the common assignee of the instant invention. This method allows for accurate alignment between optical fibers by providing three tangentially contacting parallel rods as aligning members and inserts the ends of the fibers to be joined into the interstice formed between the tangential points of contact of the rods. The carefully controlled dimensional geometry of the rods insures good alignment between the fibers since the fibers contact each of the rods at one point which in turn provides three carefully controlled reference points.

The purpose of this invention is to provide precision formed optical fiber reference surfaces which allow for accurate alignment between the fibers without the need of auxiliary precision alignment rods and without the necessity of removing the protective plastic or optical plastic cladding.

SUMMARY OF THE INVENTION

Reference planes are imparted to optical fiber surfaces by deformation of the fiber cladding plastic material within the interstices of three tangential cylinders of precise radii. In the embodiments cited these cylinders are taken as of equal radius but this is not a necessary condition. The cylindrical surfaces formed by the precision cylinders provide carefully defined reference surfaces for aligning the fiber cores when similarly formed fiber ends are used for coupling the fibers.

DESCRIPTION OF THE PREFERRED EMBODIMENT

Figure 1:
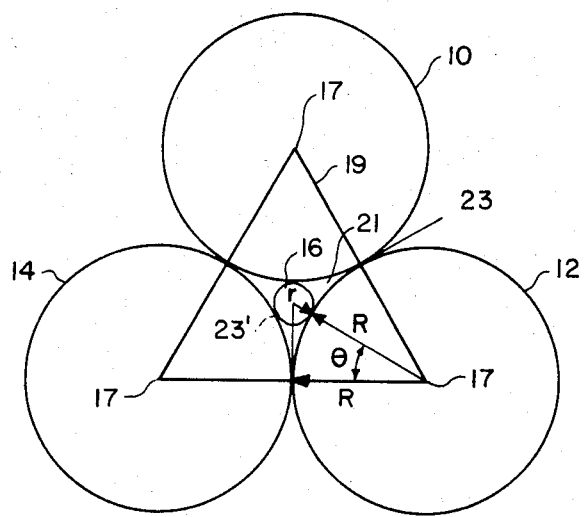
FIG. 1 is a diagrammatic representation of a fiber optical coupler of the prior art.

U.S. patent application Ser. No. 613,390 mentioned earlier and incorporated herein by way of reference describes the geometrical orientation of an optical fiber in relation to the interstices formed by three tangential circles of equal radius. FIG. 1 shows the configuration where three circles described respectively as 10, 14 and 12 describe an interstice 21 by means of three tangential contact points such as 23. The enclosed circle 16 in turn contacts each tangential circle 10, 14 and 12 at one point of contact designated as 23'. The geometrical relationship between the enclosed circle 16, the enclosed interstice 21, the enclosing circles 10, 14 and 12, and triangle 19 is described in the aforementioned patent application in greater detail. For the purpose of this embodiment for the case when the three cylinders have equal radii it is sufficient to show that the apices of the triangle 19 are located at the center point 17 of each of the circles 10, 14 and 12.

Following the teachings of the aforementioned U.S. patent application, it was discovered that the insertion of a plastic clad optical fiber within the interstice 21 when the total outer diameter of an optical fiber including the plastic cladding is slightly larger than the diameter of the enclosed circle 16 caused the plastic cladding layer to become deformed and to assume a cross-section equivalent to the geometry defined by the interstice 21. It was further discovered that the surfaces defined by the interstice 21 provide good reference planes for lining up the fibers which now are centered precisely within the interstices.

Figure 2:
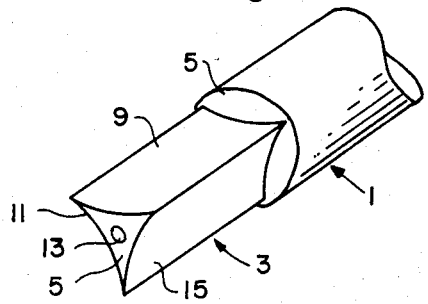
FIG. 2 is a front perspective view of the precision surface fiber of this invention.
Figure 3A:
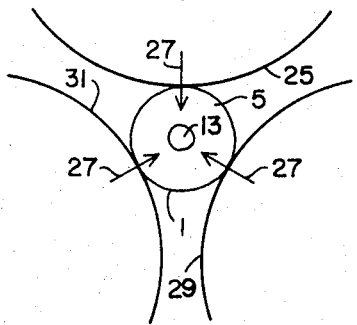
FIG. 3A is a cross-sectional view of a plastic clad optical fiber within the precision forming means of this invention.
Figure 3B:
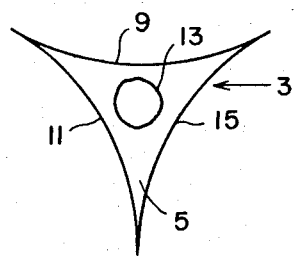
FIG. 3B is a cross-section of the precision surface fiber of this invention.

FIG. 2 shows an optical fiber 1 having a plastic cladding 5 and a silica core 13. The end of the formed fiber 3 after being placed between the interstice formed between three parallel cylinders, to be described later, resulted in a first reference surface 9, a second reference surface 11 and a third reference surface 15. The precision surface forming cylinders are shown in FIG. 3A as a first cylinder 25, a second cylinder 31 and a third cylinder 29, each cylinder carefully machined to very close tolerances. Pressure was isostatically applied to the fiber 1 by causing the cylinders to move in the direction indicated by arrows 27. This is to insure that the pressure will be equally provided in all directions of constraint. Allowing the cylinders to come into tangential contact caused the plastic cladding material 5 to flow into the interstice formed by the cylinders in contact resulting in a formed fiber 3 having the configuration shown in FIG. 3B. Formed fiber 3 now has a first reference surface 9, a second reference surface 11 and a third reference surface 15 defined by the plastic cladding 5 and conforming very closely to the geometry of the periphery of cylinders 25, 31 and 29, respectively. At the same time the cold flow characteristics of the cladding material and the isostatic forces ensure the centering of the fiber within the interstice irrespective of the fiber diameter.

Figure 3C:
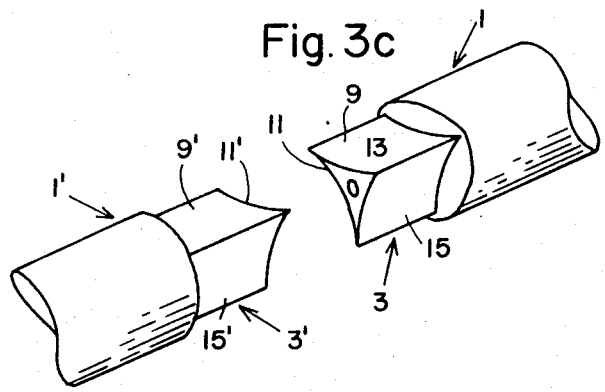
FIG. 3C is a side perspective view of two optical fibers having the precision surface configuration shown in FIG. 3B.

The use of these reference surfaces for providing close fiber alignment can be seen in FIG. 3C. Here one optical fiber 1 having a precision formed fiber end 3 with a first surface 9, a second surface 11 and a third surface 15 can be brought into precise alignment with a second fiber 1' having a precision formed fiber end 3' with first, second and third surfaces, 9', 11' and 15', respectively. This was heretofore impossible with prior art circular formed fibers because of the non-uniformity of the plastic cladding and the fiber diameter differences.

Figure 4:
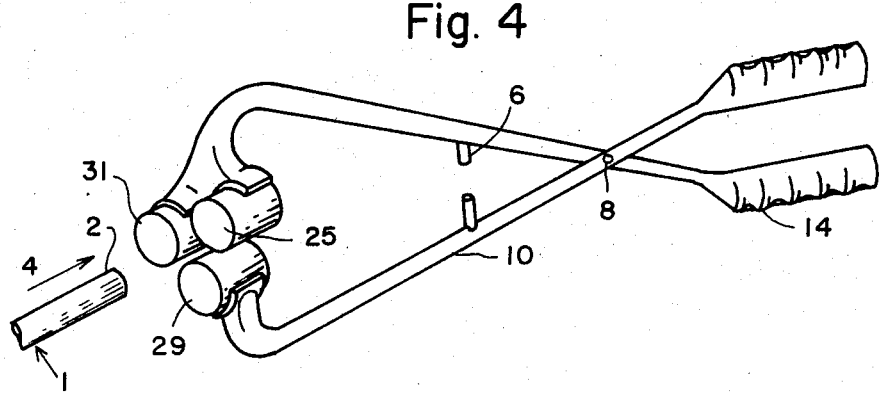
FIG. 4 is a perspective view of one embodiment of a forming tool for providing the configuration of FIG. 3B.

A relatively simple tool for providing the precision geometry to fiber optic ends is shown in FIG. 4. Here the parallel cylinders 25, 31 and 19 are shown mounted at one end of a forming tool 10 having an adjustable stop 6, pivot 8 and a pair of handles 14. Inserting the end 2 of the optical fiber 1 by moving the optical fiber between the cylinders as indicated by the directional arrow 4 and by moving the handles 14 together the cylinders move into tangential contact and cause the plastic cladding to become displaced within the interstice between the cylinders as described earlier. The adjustable stop member 6 can provide for different diameter fibers and also provide a more accurately determined tangential point of contact between the cylinders.

Figure 5:
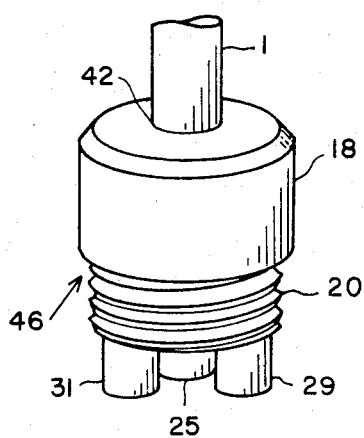
FIG. 5 is an alternate embodiment of a tool for providing the configuration of FIG. 3B.

Another tool for forming the precision surface geometry according to this invention consists of the threaded device of FIG. 5. This tool can also be used in the field with very close dimensional tolerances imparted to the fiber surface. In this application optical fiber 1 is inserted through an opening 42 in an internally threaded nut 18. Within the threaded portion 20 of the tool 46 the three precision cylinders 29, 31 and 25 are movably arranged similar to the holding members of an electric handdrill. Once the optical fiber 1 is inserted within the tool 46 the handnut 18 is tightened by rotating the threaded screw 20 in order to compress cylinders into tangential contact. The optical fiber 1 is removed from the tool 46 by loosening the handnut 18 and gently pulling the fiber back through the hole 42.

Figure 6:
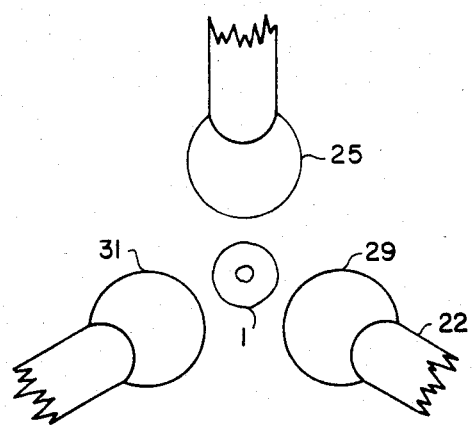
FIG. 6 is a further embodiment of a tool for providing the configuration of FIG. 3B.

Precision dimensions can be formed on the fiber during the manufacturing process by means of carefully controlled drive mechanisms employed to intermittently operate and move with the fiber during the fiber drawing process as shown in FIG. 6 without interfering with the fiber manufacture. This can be accomplished by mounting the cylinders 25, 31 and 29 by means of mechanized drive arms 22 which in turn are connected to a precision drive mechanism, not shown. In this application the precision dimensions can be imparted over periodic increments along the fiber length by causing the cylinders to come into contact with the fiber 1 and to move along with the fiber to form the precision configuration on the fiber surface and to become released from the fiber. The cylinders would then automatically return to a fixed point along the fiber manufacturing line where they would again periodically engage the fiber in the same manner. This would then impart the precision formed surfaces on the fiber at equally spaced intervals such as increments of one meter, for example, so that the fiber would have a one-inch linear extent formed with the precision surfaces at each meter increment for convenience in cutting and joining in the field. A continuous fiber having the precision surface formed at periodic intervals along its length can be seen by referring to FIG. 10A. Here a long continuous fiber 1 has the precision surface formed on the formed fiber 3 intermittently along the fiber extent. As long as the reference surfaces are precisely formed on the fiber surface the apices defining the points of intersection between the intersecting surfaces do not have to exactly conform to the apices of the included interstice of the forming cylinders. The interstices formed on the fiber surface can also be somewhat rounded during or after the forming process without in any way interfering with the good fiber coupling properties imparted by the precision surfaces.

Figure 10A:
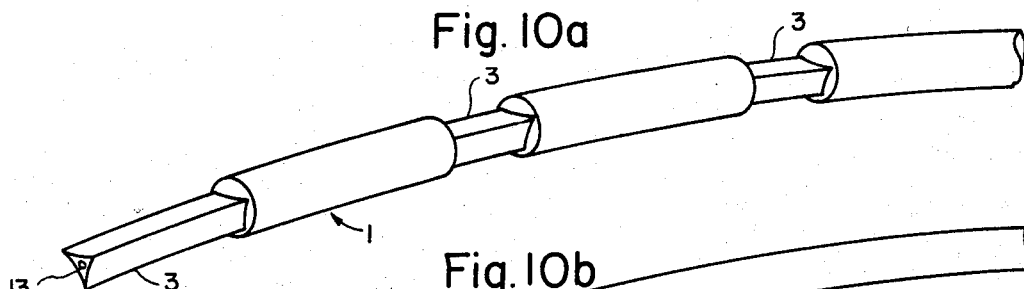
FIG. 10A is a top perspective view of a continuous fiber having the precision formed surfaces at several places along the fiber length.
Figure 10B:
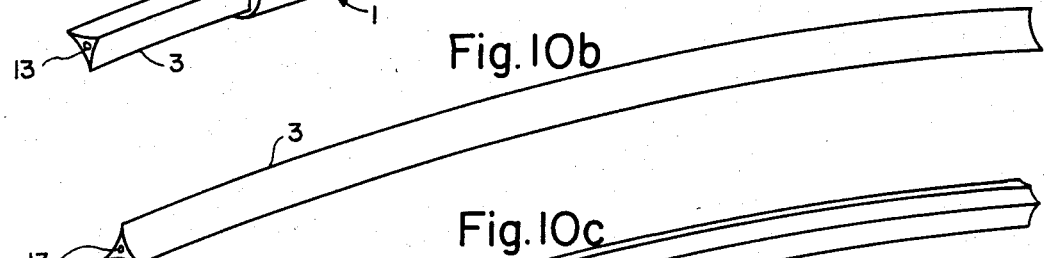
FIG. 10B is an alternate embodiment of an optical fiber having the precision surfaces of this invention along the entire length of the fiber.
Figure 10C:
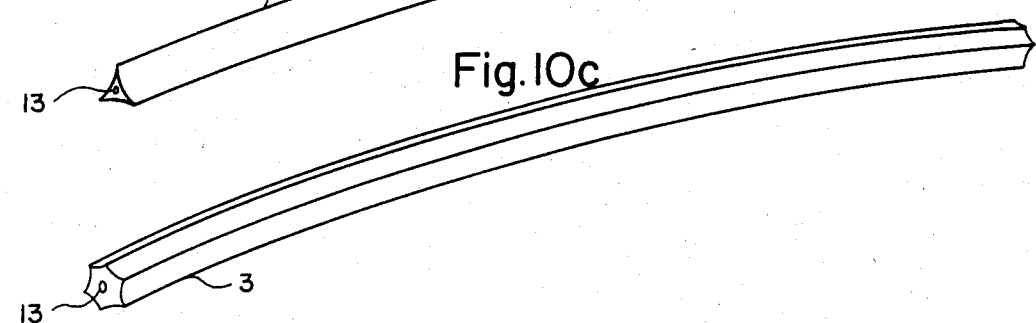
FIG. 10C shows an alternate embodiment of the fiber of FIG. 10B.

If particular care is taken not to unduly compress the plastic cladding material in the precision surface forming process the precision surfaces can be formed along the entire continuous length of the fiber. The undue compression of the cladding may cause undesirable changes in the index of refraction and cause some of the light to leak out for the case of plastic clad fiber where the plastic serves as an optical cladding. In order to provide the entire continuous extent of the fiber with the precision surfaces, it is convenient to draw the plastic clad fiber through an extrusion die having the geometry of the desired precision surface configuration. If the extrusion occurs while the plastic cladding material is in a relatively softened state during the fiber manufacturing process the plastic cladding will extrude through the precision shaped die with very little compression of the plastic material. An example of an optical fiber having the precision surfaces over its entire extent is shown in FIG. 10B. Here the precision formed fiber 3 in continuous and has a quasi-triangular configuration. FIG. 10C shows a precision formed optical fiber 3 having a quasi-hexagonal geometry along its entire extent. The hexagonal configuration is desirable when a large number of optical fibers are to be compacted into a cable due to the close packing fraction afforded by the quasi-hexagonal geometry. It is to be noted that the configuration depicted in FIG. 10A provides convenient splicing locations intermittently along the extent of fiber 1 whereas the fibers of FIG. 10B and 10C can be conveniently cut and spliced at any point along the entire extent of the fiber.

Figure 7A:
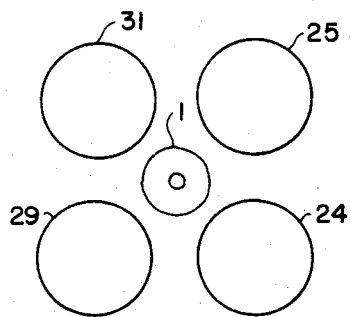
FIG. 7A is an alternate embodiment of the device of FIG. 3A.
Figure 7B:
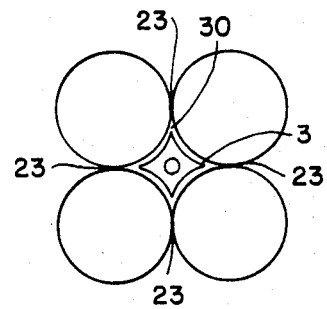
FIG. 7B is a cross-section of the device of FIG. 7A with the cylinders in contact with each other.
Figure 7C:
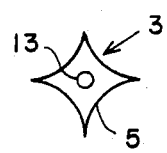
FIG. 7C is a cross-section of the precision surface fiber formed by the device of FIG. 7B.

FIG. 7A shows four cylinders used to impart the precision surface to the ends of optical fibers within the scope of this invention. Here cylinders 25, 31, 29 and 34 enclose optical fiber 1 and are brought into tangential contact such that one of the four cylinders contacts two of the remaining cylinders, and each of the cylinders contact the fiber 1 during the forming process. Formed fiber 3 is shown within the interstice 30 of the four cylinders in FIG. 7B. The points of tangency 23 are also indicated for each of the four cylinders. A cross-section of the formed fiber 3 having the cladding 5 formed into four surfaces as shown in FIG. 7C.

Figure 7D:
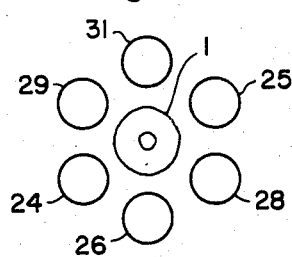
FIG. 7D is a further embodiment of the device of FIG. 7A.
Figure 7E:
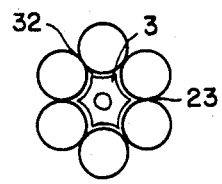
FIG. 7E is a cross-section of the embodiment of FIG. 7D with the cylinders in contact with each other.
Figure 7F:
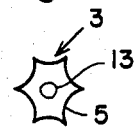
FIG. 7F is a cross-section of the precision surface fiber formed by the embodiment of FIG. 7E.

The use of six cylinders for forming six reference surfaces on the fiber is shown in FIG. 7D where the fiber 1 is enclosed within cylinders 25, 31, 29, 14, 26 and 28. FIG. 7E shows the formed fiber 3 within the interstice 32 formed by the six cylinders at their points of tangency 23. A cross-section of a formed fiber 3 having a cladding consisting of six reference surfaces is shown in FIG. 7F. For cases where more than three surfaces are formed the rods must be of equal radii and the centers of the rods are assumed to be constructed to lie on a circle.

For plastic clad silica core fibers where the silica core is slightly eccentric with respect to the diameter of the plastic cladding it was also discovered during the precision surface forming process that the plastic cladding in being displaced during forming partially corrects the eccentricity by rearranging the plastic material more uniformly with respect to the silica core so that the silica core actually becomes better centered within the formed fiber cross-section. This is due to the fact that forces required for deformation increase as material thickness of decreases.

Figure 9:
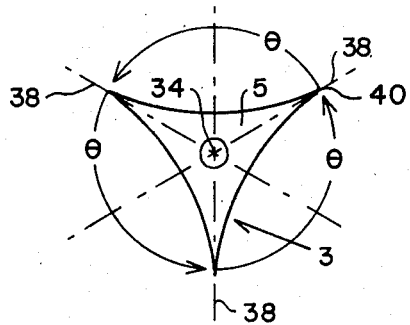
FIG. 9 is an additional cross-sectional view of the precision surface fiber according to this invention.

FIG. 9 shows in greater detail how the surfaces between the apices 40 of the formed fiber 3 can be used as reference points for lining up the core center 34. Since the cladding 5 is relatively uniformly distributed with respect to the core 13 and since the apices 40 of the formed fiber 3 are exactly geometrically spaced from each other by the angular distance θ as indicated by intersecting center lines 38 then the surfaces between the apices 40 can provide very accurate reference points for aligning similarly formed fibers. Aligning two similarly formed fibers 3 results in a corresponding alignment of their cores 13 so that the core centers 34 then coincide with the point of intersection between center lines 38.

Figure 8A:
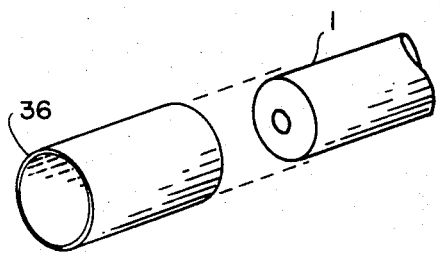
FIG. 8A is an exploded further perspective view of a ferrule and optical fiber before surface forming.
Figure 8B:
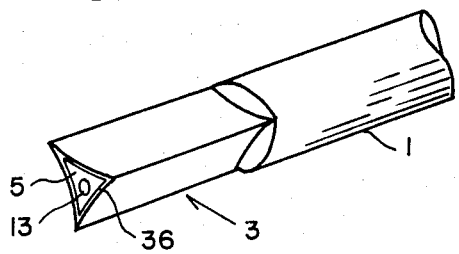
FIG. 8B is a further perspective view of the fiber and ferrule of FIG. 8A after surface forming.

When the precision reference surfaces of this invention are formed on the ends of the fiber it is beneficial to include an enclosing strengthening member to the fiber ends. One example of a ferrule-type strengthening member is shown in FIG. 8A where the ferrule 36 consists of a thin metal band which is applied to one end of the optical fiber 1 by inserting the fiber 1 within the ferrule 36 prior to precision forming the fiber end. FIG. 8B shows the optical fiber 1 with the ferrule 36 enclosing the cladding 5 and having the precision formed fiber 3 at the end. Although it is convenient to use thin metal ferrules to provide added structure to the fiber ends other type materials such as plastic can also be employed.

Although all the embodiments disclose silica core fibers with plastic cladding the reference surfaces of this invention can be imparted to optical fibers having other core and cladding materials. In the event that a glass core and glass cladding material are employed the reference surfaces of this invention can be formed on the outer material which generally encompasses the clad fiber for protective purposes. In the event that the reference surfaces of this invention are to be imparted directly to glass clad fibers then it would be desirable to extrude the glass through a suitable extrusion die during the glass melting and fiber forming processes.

Although the invention is primarily directed to providing reference surfaces to optical fibers for coupling these formed fibers for optical communication purposes, this is in no way intended as a limitation thereof. The forming of reference surfaces on optical fibers finds application wherever optical fibers may be required to be coupled together with any degree of precision.

What is claimed is:
1. A precision formed optical fiber comprising:
   cylindrical core means for transmitting light energy through said fiber;
   cladding means for promoting total internal reflection within said fiber; and
   at least three intersecting reference planes formed on the surface of the cladding for providing low light loss connection with said fiber.
2. The fiber of claim 1 wherein said at least three reference planes are defined by the interstices formed by at least three tangential cylinders.
3. The fiber of claim 2 wherein said at least three reference planes provide a quasi-triangular configuration to the fiber.
4. The fiber of claim 1 wherein said at least three reference planes are formed from a deformable material.
5. The fiber of claim 4 wherein said deformable material comprises said cladding means.
6. The fiber of claim 4 wherein said deformable material comprises a plactic layer on the fiber surface.
7. The fiber of claim 1 wherein said at least three reference planes are formed by the isostatic distortion of the fiber cladding.
8. The fiber of claim 1 wherein said at least three reference planes further include ferrule means enclosing said at least three reference planes on at least one end of said fiber for providing structural support to said fiber end.
9. The fiber of claim 8 wherein said ferrule means comprises a metallic sleeve having the same geometric configuration as the formed fiber ends.
10. The fiber of claim 8 wherein said ferrule means comprises a plastic.
11. The fiber of claim 2 wherein said reference planes are defined by the interstices formed by four tangential cylinders of equal radius.
12. The fiber of claim 11 wherein said at least three reference planes comprise a quasi-rectangular configuration.

* * * * *

UNITED STATES PATENT AND TRADEMARK OFFICE
CERTIFICATE OF CORRECTION

PATENT NO. : 4,057,322
DATED : November 8, 1977
INVENTOR(S) : Charles K. Kao

It is certified that error appears in the above-identified patent and that said Letters Patent are hereby corrected as shown below:

Claim 6, line 2, delete "plactic" and substitute therefor -- plastic --.

Signed and Sealed this

Fourth Day of April 1978

[SEAL]

Attest:

RUTH C. MASON
Attesting Officer

LUTRELLE F. PARKER
Acting Commissioner of Patents and Trademarks